Patented Feb. 17, 1953

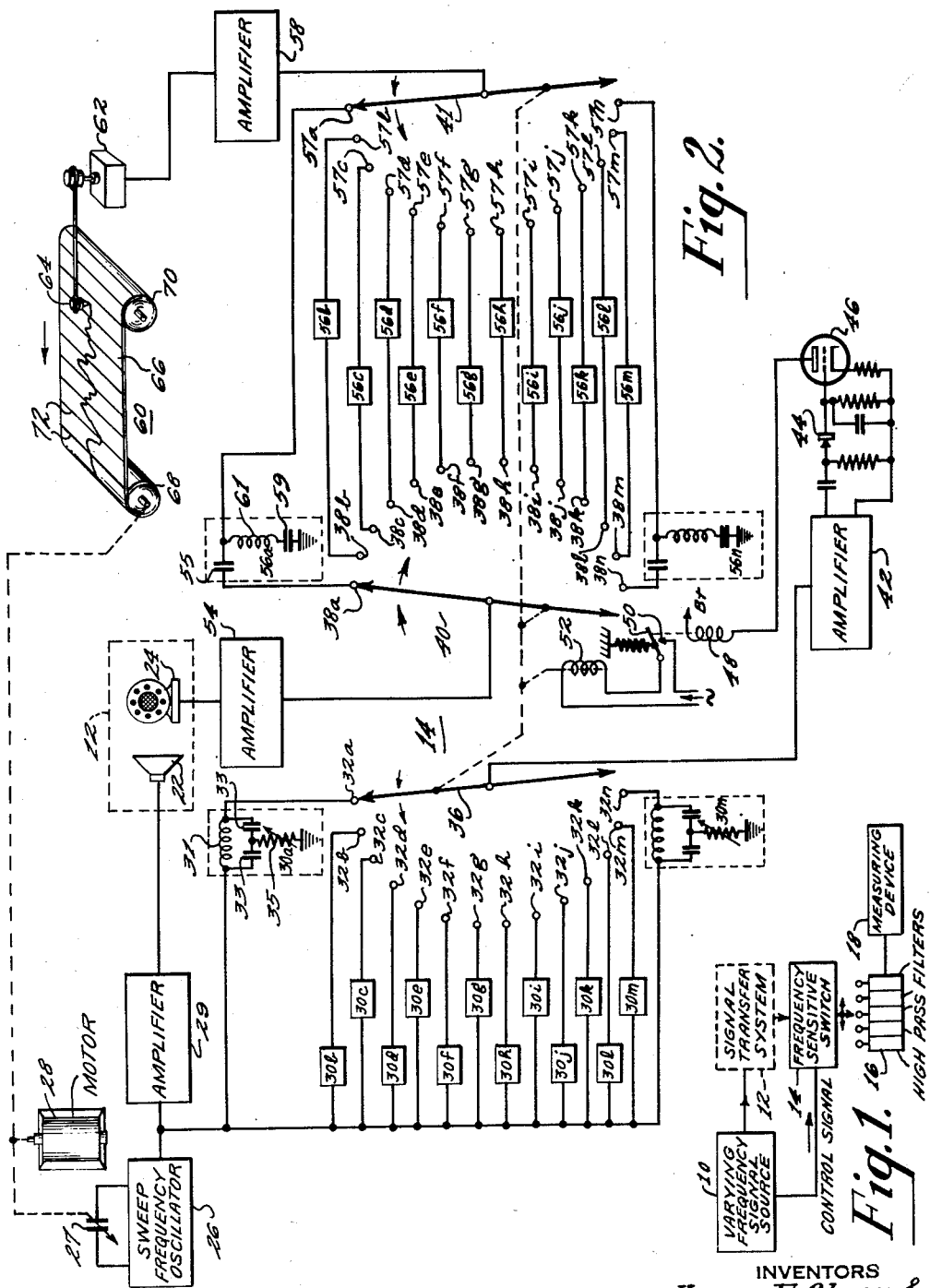

2,629,000

UNITED STATES PATENT OFFICE 2,629,000

DISTORTION ANALYZING APPARATUS

Harry F. Olson, Princeton, N. J., and Donald F. Pennie, Minneapolis, Minn., assignors to Radio Corporation of America, a corporation of Delaware Application May 26, 1950, Serial No. 164,442

8 Claims. (Cl. 175—183)

This invention relates to improvements in signal analyzing apparatus, and particularly to an improved apparatus for determining the harmonic content of a varying frequency signal.

It is well known that electrical or sound signal transfer systems, such as amplifiers, transducers, and the like, usually distort signals passing through the system. Both in designing and producing such systems, it is often necessary to determine the distortion characteristics thereof. In the case of sound systems, for example, one generally recognized measure of merit is the "system linearity," or the degree to which harmonics are generated therein. One method of measuring harmonic distortion involves passing a signal of known fundamental frequency into the system, removing this fundamental from the system output by filtering, and measuring the residual output signal as a measure of distortion. It is a general object of the present invention to provide an improved apparatus for practicing this general method of harmonic analysis.

The suppression of a fundamental signal frequency by means of a high-pass filter is not, in general, a difficult problem. For accurate results in harmonic analysis, however, this suppression must be as complete as possible. Otherwise, the increment of fundamental which will appear in the system output will be measured together with the residual harmonic signal. This, of course, will produce an inaccuracy in the measured distortion.

Usually, one is interested in analyzing a signal transfer system across a band of frequencies. In the case of a transducer such as loudspeaker, for example, the frequency band of interest may cover 16,000 cycles per second (hereinafter abbreviated "C. P. S."). Here, it is evident that different high pass filters must be connected between the transducer and the measuring device as the fundamental frequency is changed. In a typical case, as many as fourteen filters of approximately half-octave separation may be required to cover the band from 40 to 16,000 C. P. S. with adequate fundamental suppression.

For rapid and efficient operation, manual switching of fourteen different filters is unsuitable. Not only is such a procedure tedious and time consuming, but it practically precludes the use of a signal source of continuously varying frequency. On the other hand, a continuously varying or "sweep" frequency signal source is most convenient to use for rapid analysis.

It is, accordingly, a further object of the present invention to provide harmonic signal analyzing apparatus for covering a relatively wide band of fundamental frequencies and including accurate, dependable automatic filter switching means.

In accordance with the invention, the foregoing and other related objects and advantages are attained by the provision of a frequency sensitive switch to connect high pass filters into a harmonic analyzer apparatus. This frequency sensitive switch may include a plurality of sharply tuned filters, each tuned to a different frequency. As the frequency of the applied signal changes, passing through these different frequencies, the switch will respond by connecting the appropriate high pass filter into the output of the system. Preferably, each of the switch control filters is itself connected to an auxiliary set of contacts on the switch. This insures that the proper switch control filter always will be connected in the circuit.

A more complete understanding of the invention can be had by reference to the following description of illustrative embodiments thereof, when considered in connection with the accompanying drawing, wherein Figure 1 is a block diagram of harmonic analysis apparatus arranged in accordance with the invention, and Figure 2 is a partially schematic and partially block diagram showing the details of a typical apparatus corresponding to that shown in general outline in Fig. 1.

Referring to Figure 1 of the drawing, a harmonic analyzer arranged in accordance with the invention includes a varying frequency signal source 10 for supplying signals to a signal transfer system 12. The type of signal source 10 to be used will, of course, depend on the type of signal transfer system being tested. In testing an electrical circuit or a loudspeaker, for example, the source 10 may comprise a conventional variable frequency electrical oscillator. In testing a microphone, a variable frequency acoustical signal source would be utilized. An appropriate signal source will readily suggest itself for any particular case.

In order to determine the amount of harmonic distortion generated by the system 12, the output thereof is applied by the switch 14 to the appropriate one of several high pass filters 16. In the selected filter 16, the fundamental frequency of the output signal from the system 12 will be suppressed. The residual signal will be supplied to a measuring device 18 to determine the harmonic content of the signal.

In order that the correct filter 16 will be placed in the circuit at any given instant, the switch 14 is made frequency sensitive and is connected to respond to signals from the source 10. For example, the switch 14 may include a plurality of sharply tuned filters, either of the type which will pass only one frequency or of the type which will pass all frequencies except one. Various kinds of switch elements can be controlled by the selective action of such filters. For example, the switch 14 may be of the so-called electronic type, wherein a plurality of electron tubes each are connected to be turned on and off by bias voltages derived from filter elements. Alternatively, the switch 14 may comprise a mechanical switch operated by a filter-controlled relay. A typical apparatus of the latter type will be described in detail hereinafter. In any event, the frequency sensitive switch 14 will insure that a suitable filter 16 is connected in the circuit at the proper frequency. Thus, the operation of the apparatus can be fully automatic, regardless of the linearity of frequency change of the signal from the source 10 or other variable factors.

In Figure 2 of the drawing, there is shown in detail a typical harmonic analysis apparatus arranged in accordance with the invention. In this case, the signal transfer system 12 to be tested is shown as a loudspeaker 22 and a microphone 24. Here the measurement will include the combined harmonic distortion introduced by the loudspeaker 22 and the microphone 24. However, the individual distortion effect of either of these elements 22, 24 can be measured in the same way simply by previous calibration of either element alone. As a practical matter, the distortion introduced by the loudspeaker ordinarily will greatly exceed that caused by the microphone.

In Figure 2, the signal source corresponding to the source 10 of Figure 1 comprises a low distortion sweep frequency oscillator 26. Details of the oscillator 26 are omitted for simplicity, since such oscillators are well known per se. In the present case, variations in the frequency of the oscillator 26 are to be synchronized with the motion of a record medium of a recording system (described hereinafter). To facilitate illustration of this synchronization, the oscillator 26 is shown provided with a variable capacitor 27, the capacity of which is varied by mechanical coupling to a motor 28.

The oscillator 26 is connected through an amplifier 29 to the loudspeaker 22, and also is connected to a frequency sensitive switch 14. A plurality of filters 30a–30n in the switch 14 make the switch sensitive to variations in the frequency of signals from the oscillator 26. Since the filter configurations are similar, only two (30a and 30n) have been shown in detail.

The filters 30a–30n comprise so-called "bridge-T" networks which can be tuned to reject (i. e. attenuate greatly) a single frequency while passing all other frequencies without appreciable attenuation. Each filter includes an inductor 31 in shunt with two series connected capacitors 33. Accurate adjustment of each filter is provided by a variable resistor 35 which balances out the dissipative effect of the inductor.

For concreteness, it will be assumed that the frequency band covered by the oscillator 26 extends approximately from 40 to 16,000 C. P. S. Appropriate rejection frequencies for the filters 30a–30n are shown in the following table:

| Filter | Rejection Frequency | Filter | Rejection Frequency |
|---|---|---|---|
|  | C. P. S. |  | C. P. S. |
| 30a | 45 | 30h | 777 |
| 30b | 66 | 30i | 1,176 |
| 30c | 103 | 30j | 1,762 |
| 30d | 156 | 30k | 2,569 |
| 30e | 217 | 30l | 3,895 |
| 30f | 349 | 30m | 6,010 |
| 30g | 516 | 30n | 9,020 |

While the filters 30a–30n have a common input connection from the oscillator 26, the outputs thereof are connected to separate switch contacts 32a–32n. The contacts 32a–32n are arranged to be contacted in sequence by a movable contact arm 36. The contact arm 36 is connected to a circuit for controlling the movement both of the arm 36 and of second and third arms 40 and 41 which are arranged to cooperate with a second and third set of contacts 38a–38n and 57a–57n, respectively.

The switch control circuit includes an amplifier 42, a rectifier 44, and a relay control tube 46. The tube 46 is connected in series with a relay winding 48 to a source of operating voltage B+ (not shown).

When the apparatus is functioning, signals from the oscillator 26 will pass through one of the filters 30a–30n (depending on the position of the switch arm 36), and will be applied to the amplifier 42. The output signal of the amplifier 42 will be rectified in the rectifier 44, supplying a substantial negative bias voltage to the control tube 46. This bias voltage normally will prevent current flow through the tube 46 and the winding 48. When the frequency of the oscillator 26 is the same as the rejection frequency of the particular filter 30a–30n then in the circuit, the amplitude of the signal reaching the rectifier 44 will drop sharply, and then will rise again as the oscillator frequency continues to vary. When the signal reaching the amplifier 42 decreases in amplitude, the bias voltage on the tube 46 will decrease, allowing current to flow through the tube 46 and through the relay winding 48. Current flow through the winding 48 will cause closing of a set of normally open contacts 50.

The contacts 50 are connected to a source of voltage (not shown) through a second relay winding 52. The relay winding 52 is electromechanically coupled to the movable contact arms 36, 40, 41. Each time that current, which is allowed to flow through the winding 52, is interrupted, each of the contact arms 36, 40, 41 will advance one step. Thus, the various contacts 32a–32n, 38a–38n, and 57a–57n each will be contacted in sequence.

It can be seen that as the frequency of the signal from the oscillator 26 increases and passes through the rejection frequency of a particular one of the filters, say the filter 30a, the switch 14 will operate to place the next filter 30b into the circuit. Consequently, only one of the filters 30a–30n will be in the circuit at any given time, and it will always be the proper filter to respond to the varying oscillator frequency. As previously mentioned, this avoids any possibility of "overlap" in the signal rejection action of the filters 30a–30n.

The microphone 24 is connected through an amplifier 54 to the contact arm 40 of the switch 14. The contacts 38a–38n associated with the arm 40 each are connected to the input side of one of a plurality of so-called high pass filters 56a–56n. It is the function of the high pass filters to reject the fundamental frequency of the oscillator 26 at any given time, and to pass all harmonics thereof at that time. The filters 56a–56n are shown as "series m-derived" networks comprising a capacitor 55 in the series arm, and an inductor 61 and capacitor 59 in the shunt arm. It will be understood that various other well known filter networks could be used, such as so-called "constant-K," "shunt m-derived," or the like. The minimum frequency signal that can pass without appreciable attenuation through each of the filters 56a–56n is given in the following table:

| Filter | Minimum Frequency | Filter | Minimum Frequency |
|---|---|---|---|
|  | C. P. S. |  | C. P. S. |
| 56a | 47 | 56h | 781 |
| 56b | 70 | 56i | 1,179 |
| 56c | 105 | 56j | 1,764 |
| 56d | 158 | 56k | 2,670 |
| 56e | 219 | 56l | 4,000 |
| 56f | 351 | 56m | 6,015 |
| 56g | 520 | 56n | 9,025 |

The minimum frequency values given in the foregoing table represent the frequency at which the attenuation is approximately sixty decibels. In the cases of the four lowest frequency filters, 56a–56d, it was found that attenuation of sixty decibels was difficult to obtain. However, attenuations of the order of forty to fifty-five decibels can be attained at the frequencies involved and do not materially affect the accuracy of the results.

The output side of each of the filters 56a–56n is connected to one of the contacts 57a–57n. The switch arm 41 associated with the contacts 57a–57n is connected through an amplifier 58 to a recorder system 60. While it is possible to connect all of the filter outputs to a common terminal (thereby eliminating the contacts 57a–57n), the arrangement shown is deemed preferable to avoid interaction between the filters.

The recorder system 60 is shown schematically as comprising a galvanometer movement 62 connected to the amplifier 58 for controlling the lateral position of a pen 64 on a moving web of paper 66. The paper 66 is moved longitudinally by the motor 28 which is mechanically connected to a roller 68 onto which the paper 66 is wound from a supply roller 70. By synchronizing the motion of the paper 66 with the frequency variations of the oscillator 26, the record on the paper 66 can be interpreted in terms of oscillator frequency by suitable indices 72 on the paper 66.

In summary, when the apparatus of Fig. 2 is functioning, the frequency of the oscillator 26 will sweep through a predetermined frequency band (approximately 40–16,000 C. P. S. in the example assumed). A sweep time of two and one-half minutes was found to be suitable in order to allow the filters 30a–30n to respond properly. Simultaneously, the record medium 66 of the recorder 60 will move from right to left under the pen 64. As the frequency changes, the switch 14 will connect one or another of the high pass filters 56a–56n into the circuit to suppress the oscillator fundamental at all times while permitting harmonics to pass on through the amplifier 58. At the recorder 60, the pen 64 will move laterally with respect to the paper 66 in response to signals at the galvanometer 62, recording thereon the amplitude of the harmonic signal at each instant.

It will, of course, be understood that the invention is not limited to the specific embodiment shown. As previously suggested, electronic switching can be utilized where mechanical switches are unsuitable. In place of the recorder 60, a signaling device or other similar indicator might be utilized. For example, in production-line testing, it might be necessary to know only that a particular system being tested has unsatisfactory characteristics at one or more frequencies, without regard to the value of the frequency. In such case, a simple signal amplitude indicator would be sufficient.

Since the foregoing and other modifications could be made in the apparatus described, all within the scope and spirit of the invention, the foregoing is to be construed as illustrative, and not in a limiting sense.

What is claimed is:

1. In apparatus for determining the harmonic distortion introduced by a signal transfer system into a varying frequency signal passed through said system, in combination, a plurality of filter elements adapted to pass only signals of greater than predetermined minimum frequencies, the minimum frequency being different for each said filter, a signal responsive indicator, a switch to connect said system to said indicator through a selected one of said filters, and frequency sensitive switch control means connected to actuate said switch in response to variations in the frequency of said varying frequency signals to connect between said system and said indicator a preselected one of said filters at each of a plurality of preselected frequencies of said signal.

2. In a harmonic distortion analyzer of the type including (1) a varying frequency signal source for supplying signals to a signal transfer system being tested, (2) a signal responsive indicator, (3) a plurality of filter elements adapted to pass only signals of greater than differing predetermined minimum frequencies, and (4) a switch for connecting a different one of said filters between said system and said indicator as the frequency of the signal from said source varies, the combination with said source, said filters, said indicator, and said switch of frequency sensitive switch control means connected to actuate said switch in response to variations in the frequency of said signals from said source, said control means including a plurality of filters coupled to said source each adapted to pass signals of all frequencies but one, said one frequency being different for each said last-named filter.

3. Apparatus for harmonic distortion analysis, said apparatus comprising a signal source, means coupled to said source to vary the frequency of signals from said source, means connecting said signal source to a signal transfer system to be tested, measuring means connected to said system to measure the amplitude of signals passed therethrough from said source, a plurality of high-pass filters each having different low frequency cut-off characteristics, and frequency sensitive switching means connected to said source and responsive to changes in the frequency of signals from said source for connecting preselected ones of said filters between said measuring means and said system as the frequency of said signals varies.

4. Apparatus as defined in claim 3 wherein said switching means comprises a plurality of sharply tuned signal rejection filters each adapted to pass signals of all frequencies but one, said one frequency being different for each said rejection filter, a mechanical switch having a movable contact and a plurality of stationary contacts, a relay mechanically connected to move said movable contact from one to another of said stationary contacts, and a control circuit connecting said rejection filters to said relay for actuating said relay in response to a decrease in the signal received by said control circuit through said rejection filters.

5. Apparatus as defined in claim 3 wherein said measuring means comprises a recorder having a movable record medium and means to trace on said medium a record of signals applied to said recorder, said frequency varying means being coupled to operate in synchronism with the motion of said record medium.

6. Apparatus as defined in claim 3 wherein said frequency sensitive switching means includes a plurality of sharply tuned signal rejection filters connected to said signal source and each adapted to pass signals of frequencies above and below a preselected frequency which is different for each said rejection filter.

7. Apparatus for recording the harmonic distortion introduced by a transducer into signals passed through said transducer at each of a plurality of signal frequencies, said apparatus comprising a variable frequency signal source, a signal recorder having a movable record medium and means to trace on said medium a record of signals applied to said recorder, means to vary the frequency of said signal source in synchronism with the motion of said record medium, a plurality of filter elements each adapted to pass only signals of greater than a predetermined minimum frequency, the minimum frequency being different for each said filter, a switch having first, second, and third sets of stationary contacts and having a movable contact arm for each said set of contacts, relay means to move said contact arms simultaneously from one to another of the contacts in the contact set associated therewith, said filters being connected one between each of the contacts in said first and second contact sets, a connection from the movable arm associated with said second contact set to said recorder, a connection from the movable arm associated with said first contact set to said source through said transducer, a plurality of second filter elements connected one between each of said third set of contacts and said signal source, said second filter elements each being adapted to pass signals of all but a predetermined frequency, said last named predetermined frequency being different for each of said second filter elements, and a circuit connected between the movable arm associated with said third contact set and said relay means for actuating said relay means in response to changes in the amplitude of signals passing from said source through said second filters to said circuit.

8. Apparatus for harmonic distortion analysis, said apparatus comprising a variable signal source, means coupling said signal source to a signal transfer system to be tested, measuring means coupled to said transfer system for measuring a characteristic of signals passed therethrough from said source, a high-pass filter device having variable low frequency cut-off characteristics and including means for varying said low frequency cut-off characteristics, means for coupling said high-pass filter device between said measuring means and said transfer system, a rejection filter device having variable rejection frequency characteristics and including means for varying said rejection frequency characteristics, said rejection filter device being coupled to said signal source, and control means coupled to said rejection filter device and responsive to signals passed thereby for simultaneously actuating both of said varying means whereby the frequency characteristics of said high-pass filter device and of said rejection filter device are simultaneously varied.

HARRY F. OLSON.
DONALD F. PENNIE.

REFERENCES CITED

The following references are of record in the file of this patent:

UNITED STATES PATENTS

| Number | Name | Date |
| --- | --- | --- |
| 1,871,944 | Best | Aug. 16, 1932 |
| 2,159,790 | Freystedt et al. | May 23, 1939 |
| 2,224,909 | Hackley | Dec. 17, 1940 |
| 2,476,445 | Lacy | July 19, 1949 |
| 2,492,062 | Potter | Dec. 20, 1949 |